Aug. 8, 1967
P. B. PRICE ET AL
3,335,278
HIGH LEVEL RADIATION DOSIMETER HAVING
A SHEET WHICH IS PERMEABLE TO DAMAGE
TRACK PRODUCING PARTICLES
Filed Sept. 11, 1963
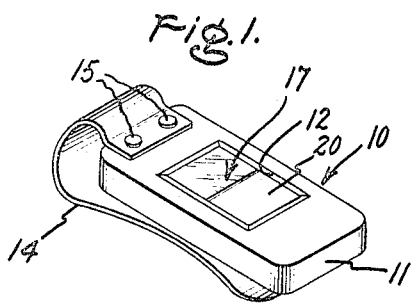
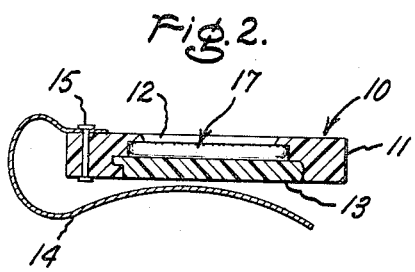
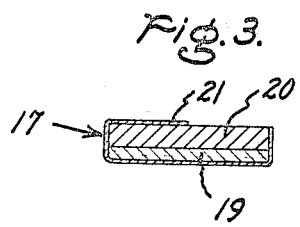
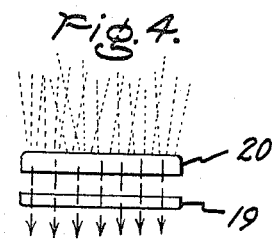
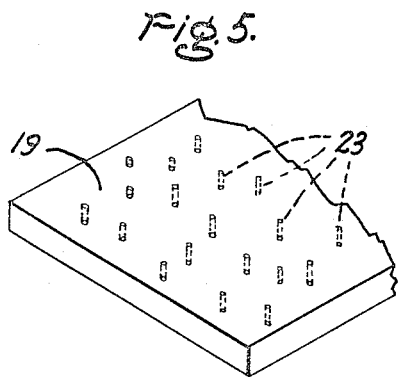
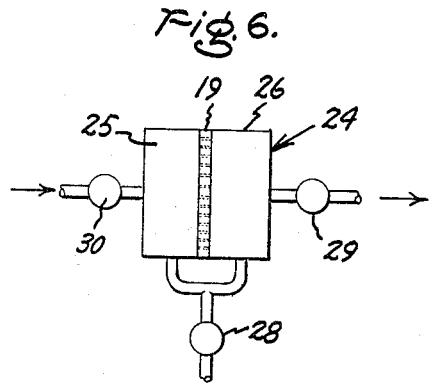
Inventors:
Paul B. Price,
Robert M. Walker,
by [signature]
Their Attorney.

United States Patent Office 3,335,278
Patented Aug. 8, 1967

3,335,278
HIGH LEVEL RADIATION DOSIMETER HAVING A SHEET WHICH IS PERMEABLE TO DAMAGE TRACK PRODUCING PARTICLES
Paul B. Price, Schenectady, and Robert M. Walker, Delanson, N.Y., assignors to General Electric Company, a corporation of New York
Filed Sept. 11, 1963, Ser. No. 308,188
7 Claims. (Cl. 250—83.1)

The present invention relates generally to the measuring and testing art and is more particularly concerned with a novel radiation dosimeter and with a new method for measuring and monitoring harmful radiation environments.

The rapid advance of radiation science and technology has resulted in an increasing demand for a versatile instrument for accurately measuring various types of radiation under widely varying circumstances. Desirably, such a device should be inexpensive and easy to use and capable of rapid, precise measurement of a broad range of low and high energetic particle doses. It should also be capable of effective use in the extreme radiation environments prevailing in nuclear reactors and nuclear explosions.

To the best of our knowledge, this demand, prior to the present invention, has remained unsatisfied and unmet. The standard badge for personnel use cannot be employed for other important radiation detection and measurement purposes. On the other hand measurement means suitable for nuclear bomb tests lack the sensitivity necessary in personnel radiation dosimeters. Moreover, these prior art means and devices are temperature-sensitive to the extent that their utility under circumstances frequently encountered in radiation environments is seriously restricted. Still further, even under ideal circumstances, they are all incapable of distinguishing thermal neutrons, fast neutrons and fast gamma rays from comparatively innocuous low-energy ionizing radiation.

By virtue of our present invention, these shortcomings and derelictions of the prior art are overcome or eliminated and important new advantages are obtained. Thus, for example, a dosimeter of this invention has unique sensitivity and can detect thermal neutrons in concentrations well below the minimum level of sensitivity of previously-known dosimeters. In addition, this dosimeter is effective to measure neutron doses over a factor at least as high as $10^{15}$ and it can be used over that range at temperatures from room temperature up to 600° C.

This invention is predicated upon our discovery that under certain critical conditions, fission fragment "tracks" are produced in bodies of mica and similar materials and the material defining these tracks can be selectively removed to produce apertures or holes through these bodies. Other inventions of ours based upon this discovery and relating particularly to novel articles and methods of new production are disclosed and claimed in our copending application, Ser. No. 176,320, filed Feb. 28, 1962, and assigned to the assignee of the present case. This invention is further predicated upon our concept of using a fissile material with such a mica-like body which under exposure to certain types of radiation will release fission fragments to produce tracks in the mica body. The number of apertures formed in the mica body by removal of the track-defining material therein thus serves as a measure of the concentration of fission-producing radiation to which the assembly of fissile material and mica has been subjected. Measurement of the porosity of the resulting porous mica body then will provide ready and accurate readout.

Broadly and generally defined, a dosimeter of this invention comprises a body of material permeable to the damage track-producing heavy energetic particles, and a source of heavy energetic particles in the form of fissile material. Since damage tracks of heavy energetic particles can be formed in the permeable material, this body serves as a track detector. The fissile material, suitably in strip form, is situated relative to the permeable body or track detector so that fission fragments produced therein by radiation to be detected or measured will produce tracks running entirely through the permeable body. Preferably, the permeable body will be in sheet form and the assembly of fissile material strip and permeable sheet will be compact and rugged but easily disassembled after use for "development" and readout.

In its method aspect, in general, this invention comprises the steps of exposing such a mica or mica-like sheet to radiation in the presence of a fissile material strip, thereafter selectively removing from the sheet the damage track-defining material, and then measuring the porosity of the mica sheet. Preferably, this method will include the step of promptly removing the mica sheet from proximity to the strip source of track-producing fission fragments following termination of the radiation measurement period. Also, the method will suitably include the step of contacting the mica sheet with an aqueous acid solution following removal of the mica sheet from the dosimeter assembly.

Those skilled in the art will gain a further and better understanding of this invention from the detailed description of the preferred embodiment set forth below, reference being had to the drawings accompanying and forming a part of this specification, in which:

FIGURE 1 is a top perspective view of a personnel radiation monitor badge equipped with a preferred form of dosimeter of this invention;

FIGURE 2 is a longitudinal sectional view of the dosimeter of the FIGURE 1 badge, showing the relative position of the dosimeter and the means for maintaining the dosimeter in position while the badge is in use;

FIGURE 3 is a vertical sectional view of the dosimeter of FIGURE 1 showing the relative position of the mica sheet, the fissile material strip and the cadmium shield;

FIGURE 4 is an exploded vertical sectional view of the dosimeter of FIGURE 1 with the cadmium shield removed and indicating the production of fissile fragments under radiation exposure of the assembly and the course of travel of such fragments through the permeable sheet material;

FIGURE 5 is a fragmentary prospective view of the permeable sheet material of FIGURE 2 after fission fragment track-defining material has been selectively removed; and FIGURE 6 is a schematic view illustrating a preferred method of measuring porosity of the permeable sheet material and thereby determining the radiation dosage to which the assembly has been subjected.

With reference to FIGURE 1, badge 10 is of design such that it may be worn by personnel in environments where they may be subjected to harmful radiation or it may be just as readily attached to a piece of equipment. The badge comprises a generally rectangular, shallow boxlike, rigid plastic body 11 having a central rectangular opening 12 in its top and a larger rectangular access opening in its other side. Closure piece 13 of the same plastic material, suitably Lucite, closes this access opening (FIG. 2) and is held in place by an S-shaped spring clip 14 of thin metal secured at one end to the top of body 11 by two rivets 15. Clip 14 thus serves the dual purpose of releasably securing badge 10 to the wearer's clothing or to some other temporary support means and maintaining closure piece 13 in position during periods when the badge is in use as well as at other times.

Dosimeter 17 of this invention is disposed in a chamber in badge 10 as shown in FIGURE 2 and held firmly in position by the closure piece with the face or front of the dosimeter assembly exposed through opening 12.

Dosimeter assembly 17, as illustrated in FIGURE 3, comprises a mica sheet 19 of generally rectangular shape (three cm. long and two cm. wide) and of thickness of less than the range of fission fragments to be detected, suitably of the order of 10 microns. Sheet 19 should for best results be of substantially uniform thickness, i.e., within about ten percent if readout is to be accomplished other than by examination under an optical microscope and counting of deep recesses and apertures of the "developed" mica sheet.

Assembly 17 also includes a fissile material strip 20 of natural uranium. Alternatively, thorium 232 (100 percent abundant), uranium 235 or uranium 238 in similar strip form may be used. Strip 20 should be of the same shape and size as the mica sheet. Shield 21 of cadmium metal completes the dosimeter assembly and is wrapped around the sheet 19 and fissile material strip 20, fully enclosing them as shown in FIGURE 3, except for about half the top surface of strip 20. Thus, the wrapper serves the additional purpose of holding the assembly together during use so that no substantial error in measurement will result from relative movement of assembly parts.

When badge 10 is worn in a radiation environment in which thermal neutrons are present, fission fragments will be produced in the uranium sheet as indicated in FIGURE 4. These fragments, by virtue of the fact that the uranium sheet and the mica sheet are held close together, will travel directly from their points of origin through the interface between strip 20 and sheet 19 and into and through the mica sheet. Accordingly, for all practical purposes, it may be assumed in using this assembly to measure radiation that all the fission fragments follow the course indicated in this drawing although it will be recognized by those skilled in the art that a small and insignificant proportion of these fragments will travel at sufficiently large angles to be stopped without completely penetrating the mica sheet. It will also be understood that while thermal neutrons will produce the effect illustrated in FIGURE 4, fast neutrons (energy greater than 1 mev.) and fast gamma rays (energy greater than 5 mev.) will produce the same effect and therefore can likewise be measured accurately by this dosimeter.

As indicated above, at the conclusion of the radiation monitoring period, mica sheet 19 is separated from uranium strip 20 and treated for the selective removal of fission fragment track-defining material and the development of porosity to be measured by means subsequently to be described. This operation thus involves removing dosimeter assembly 17 from badge 10, stripping cadmium shield 21 from the strip and sheet assembly, removing the mica sheet from the uranium strip and placing the mica sheet in a liquid etchant which will selectively dissolve the fission fragment track-defining material. This last step is disclosed in detail and claimed in our aforesaid copending application (the entire disclosure of which is incorporated herein by reference) and involves the use of a twenty percent aqueous hydrofluoric acid solution. The acid solution may be used at room temperature, but the immersion time may be reduced appreciably by operating at temperatures of 100° F. to 125° F. The action of this acid solution in leaching out the track-defining material is, however, comparatively rapid at any temperature and the operation will ordinarily be complete within about ten minutes. Action of this etchant in dissolving the damage track-defining material is quite rapid by comparison with the rate of its attack upon the mica itself and consequently, over-etching is not a source of significant error in the porosity measurements ultimately made.

The etching operation leaves the sheet 19 with a number of straight-through pores or apertures 23 which may be viewed and counted as indicated with the aid of an optical microscope. Alternatively, the porosity of the mica sheet can be determined and depending upon the equipment employed, the radiation dose may be readout directly.

Where it is desired to read out radiation exposure information by porosity measurement, this can be done by electrical conductivity or gas flow measurements using mica sheets which are of known area and of uniform thickness in the range of 10 microns. The FIGURE 6 apparatus is designed for gas flow measurement and comprises a vacuum cell 24 in which mica sheet 19 is positioned as a diaphragm to divide the cell into two chambers 25 and 26 of approximately equal size. The cell is equipped with a vacuum pump 28 for simultaneously evacuating both chambers of the cell, and with a gas pressure gauge 29 calibrated in terms of the radiation density of the environment in which the mica sheet has previously been employed. Cell 24 communicates with the atmosphere through a valve 30 so that air may be admitted to chamber 25 when sheet 19 is in place and the cell is evacuated, suitable to a pressure of one-tenth millimeter of mercury.

In actual use, assembly 17 will not detect the presence of comparatively low energy gamma rays, but is quite sensitive to fast neutrons, thermal neutrons, and high energy gamma rays. The reason for this sensitivity and discrimination between neutrons and other types of radiation is that particles lighter than about 30 AMU do not themselves form etchable tracks in most mica-like materials and electrons, gamma rays, protons and alpha particles generally have insufficient energy to induce fission in fissile material strip 20. Thus, in the isotopes used as strip 20, e.g. $U^{238}$, $U^{235}$, and $Th^{232}$, gamma ray-induced fission is a threshold process occurring at gamma ray energies greater than 5 mev. The cross-section for the $U^{238}$ reaction rises steadily from the threshold, reaches a maximum value of 14 mev. and then decreases with increasing energy. At gamma ray energies of 20 mev., the fission yields from $U^{235}$ relative to $U^{238}$ are about 2 and about 0.3 respectively. Since these cross-sections are comparable to those for fast neutron fission, high energy gamma rays will be detected by this dosimeter.

Dosimeters of this invention also have the ability to distinguish between fast and slow neutrons. As is known in the prior art, $U^{235}$ has a large cross-section for thermal neutron-induced fission, whereas $U^{238}$ and $Th^{232}$ require neutron energies approximating 1 mev. before fission occurs with a reasonable probability. The response of the detector to different energy neutrons accordingly depends markedly on the nature of strip 20. Table I indicates the relative response of these dosimeters to various particles as the function of the fission material of strip 20.

TABLE I.—RELATIVE RESPONSE OF DOSIMETER TO VARIOUS PARTICLES AS A FUNCTION OF FISSILE COVER MATERIAL

| Cover Material | Thermal Neutron Response | "Fast" Neutron Response | "Fast" Gamma Ray Response |
|---|---|---|---|
| $U^{238}$ (depleted uranium) | 0 | .6 | 0.2 |
| $U^{235}$ (enriched uranium) | 560 | 1.3 | 0.4 |
| Natural uranium | 3.9 | .6 | 0.2 |
| $Th^{232}$ (natural thorium) | 0 | .2 | 0.06 |

If dosimeter assembly 17 were to be used with shield 21 removed and with natural uranium or $U^{235}$ as the cover material of strip 20, a substantial difference from readings obtained when the shield was used might be noted. This difference would be a measure of the thermal neutron flux in the environment of study. The device can therefore be used to measure a thermal neutron flux in the presence of considerably larger fluxes of fast neutrons and fast gamma rays. If the fast gamma ray flux is known to be small, either a $Th^{232}$, a $U^{235}$, or a $U^{238}$ fissile material strip 20 could be used with a cadmium cover to measure directly the fast neutron flux. Conversely, if the neutron flux is low, the dosimeter would measure the fast gamma ray fluxes. The device is most sensitive for thermal neutrons, less so for fast neutrons and still less so for fast gamma rays. Low energy gamma rays, electrons, protons, and alpha particles do not register at all and radiation of this type does not diminish the ability of the device to measure the particles set out in Table I.

The minimum detectable total doses for various particles and fissile cover materials are set out in Table II.

TABLE II

| Cover Material | Thermal Neutrons | "Fast" Neutrons | "Fast" Gamma Ray |
|---|---|---|---|
| $U^{238}$ | Not detectable | $3.5 \times 10^6/cm.^2$ | $1 \times 10^7/cm.^2$ |
| $U^{235}$ | $4 \times 10^3/cm.^2$ | $1.6 \times 10^6/cm.^2$ | $5 \times 10^6/cm.^2$ |
| Natural uranium | $5 \times 10^5/cm.^2$ | $3.5 \times 10^6/cm.^2$ | $1 \times 10^6/cm.^2$ |
| $Th^{232}$ (natural thorium) | Not detectable | $1 \times 10^7/cm.^2$ | $3 \times 10^7/cm.^2$ |

As Table II indicates, maximum sensitivity is achieved by using a fissile cover material which is thick compared to the range of the fission fragments. Under these conditions, the number of fragments emerging from a natural uranium strip, for example, is equal to the number generated in a thickness equal to one-half the range ($R=5$ to 6 microns in natural uranium), but only part of these fragments will have sufficient energy to penetrate the mica and form easily detectable tracks. In calculating the sensitivity of the dosimeter, it is assumed that only those fission events which are produced within 1 micron of the interface between mica sheet 19 and uranium strip 16 will be registered as tracks. It is also assumed for this purpose that a minimum of ten tracks per square centimeter is necessary for dose measurement.

The range of neutron doses that the present dosimeter can measure is enormous. By using thinner strips of uranium or by using a detector in which uranium is present as an impurity and dispensing entirely with separate fissile material cover, thermal neutron doses up to about $10^{20}$ per square centimeter can be measured. The upper limit is based on the assumption that the maximum resolvable track density is $10^6$ per square centimeter and the natural uranium concentration is $10^{-11}$ atom fraction. Mica with uranium concentrations that low is available.

Because the fissile materials of strip 20 will undergo spontaneous fission and therefore produce a background of non-neutron-induced tracks in sheet 19, the present dosimeter has a minimum detectable dose rate. In other words, the rate at which the spontaneous tracks are generated must be less than the rate at which particle-induced tracks are generated in order for the particle flux to be measured. Minimum detectable particle dose rates for various particles and fissile materials are set out in the following table.

herent fission fragment damage tracks are not produced. Further, while mica and micaceous materials generally are suitable for use in dosimeters without regard to whether they are to be used as personnel radiation dosage monitors or to measure extremely high energetic particle doses, there are non-micaceous materials which have special utility in certain radiation dose ranges. Accordingly, the track detector material selection may depend upon the particular radiation environment in which the dosimeter is to be used and, to some extent, on the user's preference.

Glasses of all kinds, both natural and synthetic, and synthetic organic materials, particularly resins or plastics of both thermosetting and thermoplastic types, are generally suitable for use in these new dosimeters.

Plastics, both synthetic and natural, which can be made in the form of thin sheets of approximately one-half mil thickness have a special advantage in that they are easy to assemble in the dosimeter. Additionally, these materials in sheet form are easy to mount in a gas flow readout device of the type described above because of their flexibility and generally they are inexpensive and easy to manufacture in sheet form in large volume. Glasses, on the other hand, can be in the form of sheets of thickness of a typical microscope slide and, unlike plastic materials, glasses are useful in very high radiation environments. Fissile material strip 20 may be eliminated in dosimeters including glass for such use because the glass itself will contain sufficient quantities of natural uranium to provide the necessary track-producing fission fragments. In fact, in such extreme radiation environments, a fissile source material such as strip 20, will cause riddling of the glass plate track detector to the extent that it cannot serve its dose measuring purpose. The synthetic organic sheet materials, on the other hand, cannot be used under any circumstances to advantage in such extreme radiation environments as prevail in nuclear reactors regardless of whether a separate source of fissile material is provided. Both severe radiation damage and high temperature damage render plastics and similar materials useless in these circumstances.

Depending upon the kind of track detector material employed, the etchant may be an aqueous alkaline solution, or it may be an aqueous acid solution, or any of a wide variety of other liquid phase reagents effective to selectively dissolve and remove the fission fragment track-defining phase in the track detector body. Thus, while aqueous hydrofluoric acid solutions are preferred for this purpose where micaceous materials or glasses are employed, a caustic solution or a lime solution will give good results with many synthetic organic materials including plastics. Generally, the more concentrated the reagent solution the more rapid the selective dissolving action and temperature likewise has an accelerating rate in that dissolving action rate increases the temperature of the etching or leaching medium is increased. Thus,

TABLE III

| Cover Materials | Thermal Neutrons | "Fast" Neutrons | "Fast" Gamma Rays |
|---|---|---|---|
| $U^{238}$ | Not detectable | $4.6$ cm.$^{-2}$ sec.$^{-1}$ | $14$ cm.$^{-2}$ sec.$^{-1}$ |
| $U^{235}$ | $2.2 \times 10^{-4}$ cm.$^{-2}$ sec.$^{-1}$ | $2.1$ cm.$^{-2}$ sec.$^{-1}$ | $0.3$ cm.$^{-2}$ sec.$^{-1}$ |
| Natural uranium | $0.7$ cm.$^{-2}$ sec.$^{-1}$ | $4.6$ cm.$^{-2}$ sec.$^{-1}$ | $14$ cm.$^{-2}$ sec.$^{-1}$ |
| $Th^{232}$ (natural thorium) | Not detectable | $1.4 \times 10^{-4}$ cm.$^{-2}$ sec.$^{-1}$ | $4.2 \times 10^{-4}$ cm.$^{-2}$ sec.$^{-1}$ |

While the track detector or permeable material body of the dosimeter of this invention has been described above as being mica or mica-like, it will be understood that there are a wide variety of materials which can be used instead of mica in these dosimeters to obtain the primary objectives of this invention. Generally, any electrically non-conducting solid is suitable for this purpose. Thus, metals and graphite, for example, cannot be used effectively as track detectors because electron mobility in them results in diffusion to the extent that cofor example, commercial concentrated hydrofluoric acid (48% HF) exerts a more powerful etching action at room temperature than a 20% HF solution does at 50° C. and by increasing the temperatures of these etchant solutions the times required to achieve a given damage track removal result are reduced. Again, however, the limitations of the materials available and the desires of the operator will dictate the selection of reagent concentration and etching solution temperature in carrying out this phase of the present invention method.

Example I

Using the badge of FIG. 1 to monitor personnel radiation doses, a one-half mil sheet 19 of commercial polycarbonate resin (disclosed in U.S. Patents 2,946,766 and 2,950,266) is employed as track detector element 19 and a sheet of natural uranium two mils thick serves as fissile material source 20. This assembly is mounted in the manner illustrated in the drawings except that cadmium shield 21 is omitted. The device is calibrated by positioning it 10 cm. from a body of californium as a neutron source. Since the number of neutrons released per second by the californium is known and the energy spectrum of these neutrons is also known, the effectiveness and sensitivity of this dosimeter as a radiation monitor or measuring device is readily established. After exposure in this manner over a period of seven days, the dosimeter is disassembled and plastic track detector strip 19 is immersed in 5N NaOH at 50° C. and is maintained therein for a period of one hour. Thereafter, the plastic strip is rinsed with water, dried in air and then examined under an optical microscope at a magnification of 250 diameters. The fission fragment tracks in strip 19 are counted and the number obtained serves as a basis for measuring radiation with other dosimeters of these specifications in environments of this general type.

Example II

Again the badge of FIG. 1 is used except that in this case because extremely high radiation levels are to be tested, body 11 is of aluminum instead of plastic. A commercial soda-lime glass microscope slide of standard thickness (2 mils) is mounted in the badge in place of the assembly illustrated in FIG. 3. The badge is then placed in a nuclear reactor for a period of one day whereupon it is removed and the glass is immersed in a 20 percent aqueous solution of hydrofluoric acid at 20° C. for a period of ten seconds. Following rinsing and drying of the glass, the recesses left by the etching action of the acid solution on the fission fragment tracks in the glass are counted under an optical microscope at a magnification of 250 diameters. Because of the very low concentration of uranium in glass, i.e., of the order of 1 part in $10^6$, such a device is feasible for use in the extremely high radiation level environments encountered in operating nuclear reactors and nuclear explosions.

Example III

Again in a repetition of the procedure of Example II, a natural mica (muscovite) of two mils thick is mounted in aluminum badge 11 of FIG. 1 and disposed in a nuclear reactor for a period of a week. Again the mica strip serving as the track detector is used alone, its natural uranium content being relied upon as the source of track-producing fission fragments. The enormous dose measurement capacity of this embodiment of the invention is attributable to the extremely small natural uranium content of this mica being on the order of 1 part in $10^{10}$. The "development" of the fission fragment tracks and the observation and counting of them is as described in Example II.

Example IV

In a variation of Example I, cadmium shield 21 is used as shown in FIGS. 1 and 3 so that only half of the top surface of strip 20 is covered by the shield. This enables distinguishing between thermal neutrons and fast neutrons, the former being incapable of penetrating the shield to produce fission fragments in strip 20.

Having thus described this invention in such full, clear, concise, and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What we claim as new and desire to secure by Letters Patent of the United States is:

1. A device for the measurement of radiation in the extremely high level radiation environments prevailing in nuclear explosions and in operating nuclear reactors which comprises a sheet of a high temperature-resistant material which is permeable to damage "track"-producing heavy energetic particles and contains from one part in $10^6$ parts to one part in $10^{10}$ parts of fissile material, and a thermal neutron shield body disposed adjacent to and covering a portion of the surface of the said sheet.

2. The method of measuring radiation in the extremely high level radiation environments prevailing in nuclear explosions and in operating nuclear reactors which comprises exposing to the radiation source to be measured a body of material selected from the group consisting of glass and mica containing from one part in $10^6$ parts to one part in $10^{10}$ parts of fissile material, removing said body from exposure to the radiation source, selectively dissolving and removing from said body fission fragment damage "track"-defining material, and thereafter determining the number of recesses formed in the body by the selective dissolving and removing operation.

3. A device for the measurement of radiation in the extremely high level radiation environments prevailing in nuclear explosions and in operating nuclear reactors which comprises a sheet of muscovite mica containing from one part in $10^6$ parts to one part in $10^{10}$ parts of fissile material, and a cadmium foil wrapped around the mica sheet and exposing only a portion of the top surface of the said sheet.

4. A device for the measurement of radiation in the extremely high level radiation environments prevailing in nuclear explosions and in operating nuclear reactors which comprises a sheet of soda-lime glass containing from one part in $10^6$ parts to one part in $10^{10}$ parts of fissile material, and a cadmium foil enclosing the glass sheet except for a portion of the top surface of the said sheet.

5. The method of measuring radiation in the extremely high level radiation environments prevailing in nuclear explosions and in operating nuclear reactors which comprises exposing to the radition source to be measured a sheet of muscovite mica about two mils thick containing from one part in $10^6$ parts to one part in $10^{10}$ parts of fissile material, removing said mica sheet from exposure to the radiation source, selectively dissolving and removing from said mica sheet fission fragment damage "track"-defining material, and thereafter determining the number of recesses formed in the mica sheet by measuring the porosity of the said sheet.

6. The method of measuring radiation in the extremely high level radiation environments prevailing in nuclear explosions and in operating nuclear reactors which comprises exposing to the radiation source to be measured a two-mil-thick sheet of commercial soda-lime glass containing from one part in $10^6$ parts to one part in $10^{10}$ parts of fissible material, removing said glass sheet from exposure to the radiation source, selectively dissolving and removing from said glass sheet fission fragment damage "track"-defining material, and thereafter determining the number of recesses formed in the glass sheet by optical microscope counting.

7. The method of detecting and separately measuring fast neutron radiation and thermal neutron radiation which comprises the steps of exposing to a radiation source an assembly comprising a sheet of material permeable to damage track-producing heavy energetic particles and a strip of fissile material covering said sheet and a thermal neutron shield body enclosing the said strip and sheet except for a portion of the top surface of the strip and thereby causing fission fragment damage tracks to be produced in the said sheet, and thereafter developing the exposed permeable material sheet by contacting the said sheet with an aqueous reagent solution and thereby selectively dissolving and removing from the sheet damage track-defining material and producing apertures in the sheet, and measuring the porosity of the resulting porous permeable material sheet and comparing the porosity of shielded and unshielded portions of the sheet.

References Cited

UNITED STATES PATENTS

| | | | |
|---|---|---|---|
| 2,799,637 | 7/1957 | Williams | 204—143 |
| 2,920,038 | 1/1960 | Feldbauer et al. | 208—310 |
| 2,933,605 | 4/1960 | Ross et al. | 250—83.1 |
| 2,989,385 | 6/1961 | Gianola et al. | 156—8 |
| 2,991,363 | 7/1961 | Rosenthal | 250—83.1 |
| 3,024,867 | 3/1962 | Milton | 55—33 |
| 3,024,868 | 3/1962 | Milton | 55—33 |
| 3,140,397 | 7/1964 | Henry | 250—83.1 |

OTHER REFERENCES

Price, P. B., et al.: Electron Microscope Observation of Etched Tracks From Spallation Recoils in Mica, Physical Review Letters, vol. 8, No. 5, Mar. 1, 1962, pp. 217–219.

RALPH G. NILSON, *Primary Examiner.*

S. ELBAUM, *Assistant Examiner.*